D. W. MAPLES.
Cheese Vat.
No. 32,198.
Patented April 30, 1861.
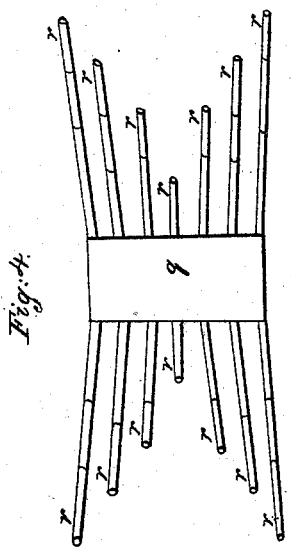
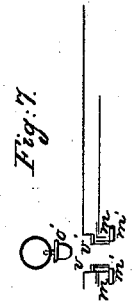
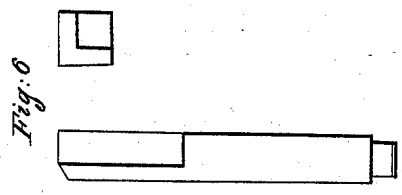
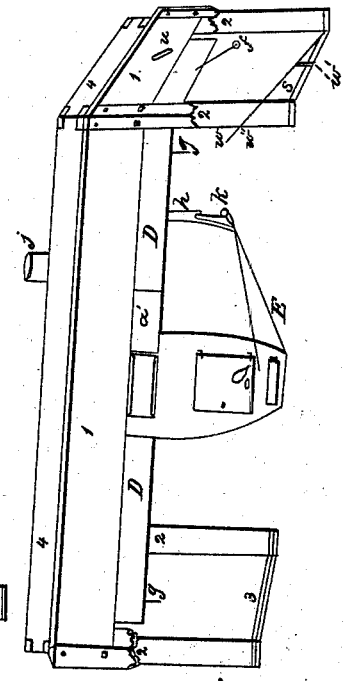
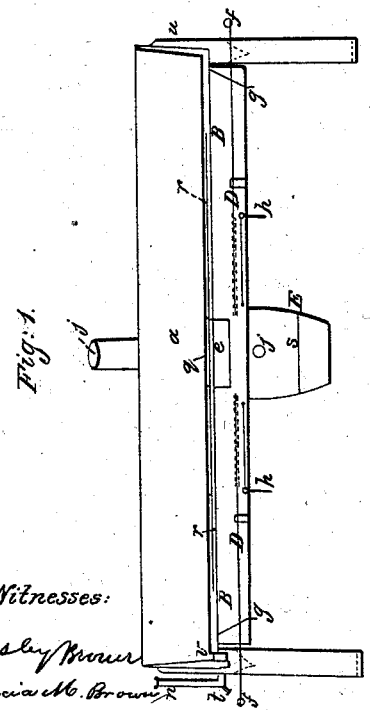
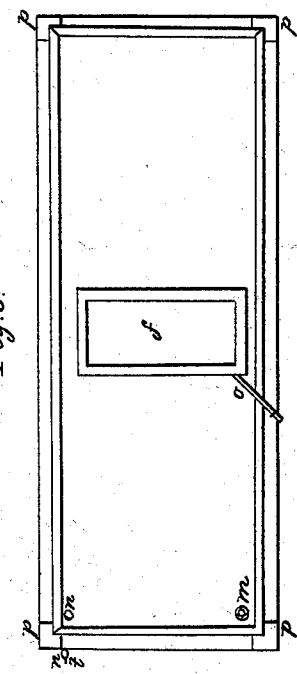
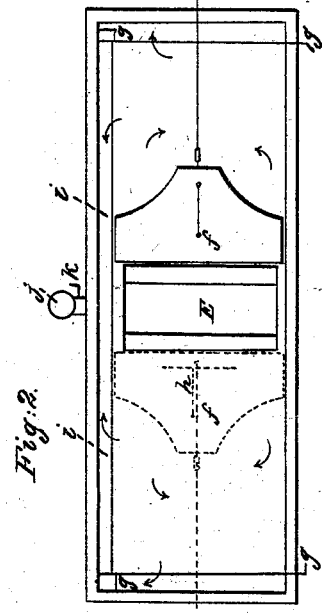
Witnesses:
Inventor:

UNITED STATES PATENT OFFICE.

DARIUS W. MAPLES, OF HOMER, NEW YORK.

CHEESE-VAT.

Specification of Letters Patent No. 32,198, dated April 30, 1861.

*To all whom it may concern:*

Be it known that I, DARIUS W. MAPLES, of Homer, in the county of Cortland and State of New York, have invented new and useful Improvements in Cheese-Vats and in the Apparatus for Heating the Same; and I do hereby declare the following to be a full, clear, and exact description of the same, reference being had to the annexed drawings, making a part of this specification, in which—

Figure 1 is an upright longitudinal sectional view of cheese vat and heating apparatus. Fig. 2 is a top view of heating chamber—detached from cheese vat. Fig. 3 is a representation or top view of inside of water vat. Fig. 4 is a representation of heat or hot water distributer. Fig. 5 is a corner view of cheese vat and heating apparatus. Fig. 6 is a side view of one leg of cheese vat also a view of upper end of leg. Fig. 7 is a sectional view of tubes for drawing off whey—and a view of plug for stopping same.

The annexed drawings are made on a scale of an inch to the foot.

Vats are varied in size to suit the wants of dairies.

The cheese vat consists of a frame, milk vat, water vat, and stove and heating chamber and fixtures, as hereinafter described. The frame, as shown in Fig. 5, is made of wood and has two side and two end pieces 1, 1, and four corner posts 2, 2, 2, 2. The posts below the side pieces serve as legs. The inside corner of posts is cut or rabbeted out, (from upper end down as far as side pieces extend), as in Fig. 6, also $p$. Fig. 3, so as to leave the uncut sides of post of one half the thickness of the side and end pieces. Into that part of the post from which the corner is removed the corner formed by mitering together a side and end piece is neatly fitted—being halved in. The end of the side and end pieces rests upon a shoulder formed by cutting out the inside corner of post as above stated. The posts are fastened by joint bolts to end and side pieces. This arrangement makes the frame firm and tight. At each end the legs are framed into and rest upon a cross bar 3 3, Fig. 5.

E, Figs. 1 and 5, is a stove with grate for holding wood and space in lower part for ashes. It extends under and is united or joined to the bottom of the heating chamber D. The stove has no upper plate. Immediately over the heating chamber and stove is the water vat B, Fig. 1, the bottom of which forms the covering to the heating chamber.

The water vat is made by fastening a pan of heavy sheet iron of about one half of the depth of the side pieces of frame to the inside of said frame. The bottom of this pan is on a line with the lower edge of the side and end pieces. This is so firmly and closely fitted to the frame, as, with it, to form a water tight box. In the bottom of this vat is a depression or pit $b$, Fig. 3. This is made of cast iron and is firmly and tightly riveted to the bottom of the vat.

Above and in the water vat sits the milk vat $a$, Fig. 1. This is made of tin (or other metal) set in, and attached to, a narrow wooden frame 4 4, Fig. 5, which frame rests in a rabbet on the upper and inner edge of side and end pieces 1 1, Fig. 5. This vat is smaller at the bottom than top, and is of such size as to leave sufficient space under and around the same to admit water for heating and cooling the milk or whey in it.

Such is the arrangement of the stove and heating chamber that the heat is simultaneously applied to and made to pass under the entire water vat, going in both directions from the stove and passing around the partition $i\ i$, Fig. 2, at its extremities in the direction indicated by the arrows, and out the pipe $j$, Fig. 2.

$g$, $g$, are dampers. By turning up one of them against the end of partition $i$, $i$, the head is thrown in opposite end of heating chamber, and under opposite end of water vat, and compelled to pass around the other end of partition. By closing them both, and opening the flue in lower part of pipe $j$, Fig. 2, by means of damper $k$, the heat would pass out at end of stove, at the pipe. $f$, $f$, are also dampers—cast iron. By sliding them in over the stove E, Fig. 2, the stove is entirely covered and most of the heat thereby shut out of heating chamber. By opening the flue in pipe $j$, by means of damper $k$, Fig. 2, the heat is caused to pass directly out the pipe.

$h$, $h$, are levers by means of which and the cross bars at the upper end of same, as in Figs. 1 and 2, the dampers $f$, $f$, are elevated and the heat is made to pass under them, instead of over, so that they may not only be used as dampers to shut out the heat from the heating chamber, but also as shields to prevent that part of the water vat directly over the stove from being heated more rapidly than other portions of the vat. And in case it is desired to cool said heating chamber and water vat, after shutting off the heat by means of the dampers, as above described, it can be done by means of a slide a', Fig. 5, over the front end of stove. By drawing this slide cool air is admitted to said heating chamber, and by turning down the dampers g, g, Fig. 2, it is made to pass its currents under the entire water vat, in the courses indicated by the arrows in Fig. 2.

The stove, heating chamber, and water vat, are so arranged that a small amount of heat applied to the entire bottom surface of the water vat, will, in a very short time, raise the temperature of the water in the vat to the desired point. By means of the dampers, levers, and slide above named, the heat can be used, tempered, and controlled, at the pleasure of the operator. The heat can be applied uniformly and evenly to the entire bottom surface of the water vat. The water is increased in temperature uniformly in the different parts of the vat, so that the milk or whey in the milk vat is heated evenly, not rapidly at one point, and slowly at another, but in all places where it is exposed to the action of the water in water vat, alike, which is an object greatly to be desired.

The depression, sink, or pit b, Fig. 3, in water vat B, B, Fig. 1, which is also represented by Fig. 3, is directly over the stove. This pit resembles the bottom of a stove boiler. When desired the entire heat of the stove can be applied to this, until the water in it is hot, while that in remainder of the vat is only tepid.

O, Fig. 3, is a faucet, by which water can be drawn from the pit, for any purpose desired, such as washing pans, pails, &c.

Fig. 4 is a heat distributer, which is placed in the water vat (Fig. 3) so that g, fits like a boiler cover to the pit b. The cover prevents heated water in the pit from passing directly upward and heating too rapidly that part of the milk vat immediately over the stove. In the sides of this cover are tubes r, r, &c., which are of different lengths. They carry the heated water from the pit to various parts of the vat, thereby distributing the heat and equalizing the temperature of the water in the vat. These tubes are made in sections, so that the length may be varied at pleasure.

n, Figs. 1 and 3, is a pipe for conveying water into the water vat, at n, Fig. 3. Under the vat in this pipe is a faucet t, for drawing the water from vat. When it is desired to keep milk cool in vat, a stream of cold water is passed in at pipe u, and, after filling water vat, around milk vat, passes out at pipe n, Figs. 1 and 5.

At v, in bottom of milk vat, Fig. 1, is a slight depression, from which a short tube v', Fig. 7, extends into and through the water vat below. On the outside of this tube, a screw thread is cut, making of it a screw. In the bottom of water vat, at m, Fig. 3, is a short cast iron tube, Fig. 7, m. On the upper surface of this short tube is an india rubber or other gasket. Through the gasket and tube passes a smaller tube, Fig. 7, m', of such size that having a screw thread cut on the inside it forms a nut, by means of which it can be firmly and tightly fitted and screwed on to tube v' in bottom of milk vat. The tube m', Fig. 7, passing up through short tube m, as above, has a shoulder, or projection, which is fitted to the bottom of the short tube m, m, in water vat. As it is drawn up by the operation of the screw in the bottom of the milk vat, it is made to press firmly against the lower surface of the short tube m, m, in the bottom of the water vat. The bottom surface of sink or pit v, rests on the gasket, above named, so that when the tube m', m' is firmly screwed on to tube v', said bottom surface is pressed so firmly against the gasket as to make the water vat water tight, and prevent the water in the vat from reaching the screw. These tubes are used as a passage way for drawing off whey from the milk vat. A plug o', Fig. 7, is neatly fitted to the tube v' in bottom of milk vat, to make vat tight when desired. For the purpose of straining off the whey a tall tin strainer is set in the bottom of vat around the upper surface of the tube, of sufficient size to admit the hand to remove the plug.

w, in Fig. 5 is a lever attached by hook at lower end to cross bar on which the legs of frame rests. The lever rests on a fulcrum or iron bolt w', which passes through the center of said cross bar. By means of this lever the end of the frame work and vats is elevated so as to cause the water and whey to flow into opposite end of their respective vats, to facilitate the process of drawing them out. When elevated to the desired height, the lever is held in its position by a ratch w'' on one of the legs.

What I, the said DARIUS W. MAPLES, claim as my invention and desire to secure is the following, viz:

1. The distributer (Fig. 4 and q, r, r, Fig. 1) and its application to the purpose of an equal distribution of the heat in and under a vat for cheese making, substantially as and for the uses and purposes hereinbefore set forth and described.

2. The arrangement and combination of the stove (E) with its peculiar construction, substantially as shown in the drawings and specifications, and with the heating chamber (D) and the dampers attached, as described and shown, and with the aforesaid distributer (Fig. 4) and with the conductor for drawing off the whey as constructed and arranged and hereinbefore described in Fig. 7 of said specifications and applied to a vat for cheese making, as described in said specifications and as and for the uses and purposes therein described.

D. W. MAPLES.

Witnesses:
   C. B. SEDGWICK,
   OSCAR L. SPRAGUE.